March 6, 1956 H. N. CROOKS ET AL 2,737,583
SIGNAL RESPONSIVE CIRCUIT
Filed June 28, 1952
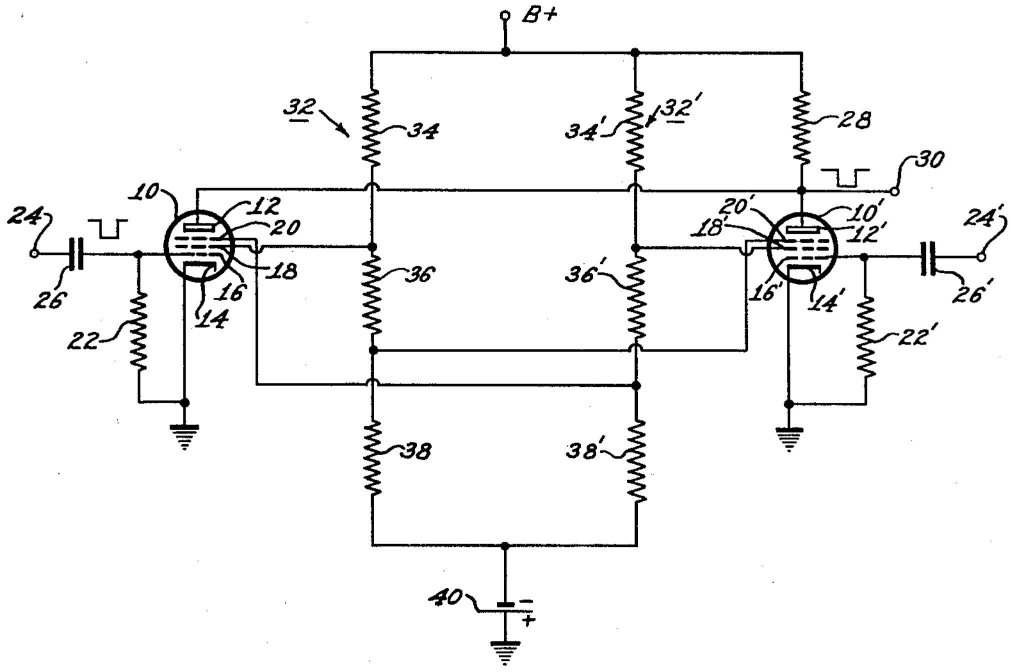
INVENTORS
HORATIO N. CROOKS &
LINDER C. HOBBS
BY Morris A. Rabkin
ATTORNEY United States Patent Office 2,737,583

Patented Mar. 6, 1956

2,737,583

SIGNAL RESPONSIVE CIRCUIT

Horatio N. Crooks and Linder C. Hobbs, Haddonfield, N. J., assignors to Radio Corporation of America, a corporation of Delaware Application June 28, 1952, Serial No. 296,155

6 Claims. (Cl. 250—27)

This invention relates to information handling devices and computers, and particularly to an electronic signal responsive circuit having utility therein.

Gating and buffer circuits used in the digital computer art have been given a nomenclature which relates to the logical function performed by the circuit. A gate is sometimes called a logical "and" circuit, and a buffer is called a logical "or" circuit. Circuits of this general type are described in "High-Speed Computing Devices" by Engineering Research Associates, McGraw-Hill, 1950, chapter 4. One form of logical circuit is that in which the function "either but not both" is produced; that is to say, an output pulse is produced if a signal pulse is applied to either one or the other of two inputs but not if a pulse is applied to both inputs. This type of circuit is of general utility in the digital computer art as a switching circuit. It may also be used to determine if two bits or binary digits of binary information are represented by an odd or even number of pulses; and a plurality of each circuits may be combined to perform a parity check.

In the prior art, the operation of "either but not both" generally requires a plurality of circuits which are responsive to different signal combinations, and which are combined to produce the desired result. Such circuits are described in "High-Speed Computing Devices," supra, chapter 13. In a typical example, the desired function is produced indirectly by a plurality of circuits. One of the circuits produces an output pulse when either or both of two inputs receive pulses (an "or" circuit), and another circuit produces an output only when both inputs receive pulses simultaneously (an "and" circuit). The circuits are coupled to neutralize any simultaneous output therefrom when both inputs are pulsed simultaneously, but to produce an output pulse when one or the other input is pulsed. It is apparent that it is desirable to provide an improved and simple circuit which has the inherent function of "either but not both," and which functions in such manner directly and economically.

Accordingly, it is an object of this invention to provide a new and improved signal responsive circuit of the type producing an output signal when a signal is present at either of two inputs but not present at both simultaneously.

Another object of this invention is to provide a simple signal responsive circuit which is economical and reliable.

Still another object of this invention is to provide a simple electronic circuit having two inputs, that translates signals received by either input and that neutralizes signals received simultaneously by both inputs.

These and other objects of this invention are achieved by providing a circuit including a first and a second pentode of the type having first, second and third control grids. Input terminals are coupled to the first control grids of the tubes, and a common output terminal is coupled to the anodes of both tubes. The second control grid or screen grid of each tube is cross-coupled through a voltage divider to the third control grid of the other tube. Both tubes are operated, in the absence of input signals, with the first control grid biased for conduction and the third control grid biased to cut off, thereby permitting screen current to flow but not plate current. If a negative input pulse is applied to the first control grid of either tube, the screen current of that tube is cut off which in turn causes the voltage along the voltage divider coupled to the screen to rise, and thereby the voltage on the third control grid of the other tube rises. This allows plate current to flow in the other tube which results in a negative output pulse. However, if negative pulses are applied simultaneously to the first control grids of both tubes, the negative voltage on the first control grid maintains the plate current in both tubes cut off despite the resulting rise in voltage at the third control grids. Thus, there is no output pulse.

The organization and method of operation of the invention may be best understood from the following description and the accompanying drawing in which there is shown a schematic circuit diagram of an embodiment of the invention.

Referring to the drawing, a circuit embodying this invention includes a first electron discharge tube 10 and a second electron discharge tube 10'. The tubes may be multigrid (that is, multielectrode) tubes such as pentodes, each having an anode 12, 12', a cathode 14, 14', and a first, second and third control grid 16, 16', 18, 18', and 20, 20'. The first control grid 16, 16' of each tube 10, 10' is connected to the cathode 14, 14' of the tube through a grid-leak resistor 22, 22'. The first control grids 16, 16' of the tubes 10, 10' are also respectively coupled to first and second input terminals 24, 24' through coupling capacitors 26, 26'. The anodes 12, 12' of the tubes are connected to a source of operating potential through a common anode load resistor 28 and are also coupled to a common output terminal 30. First and second voltage dividers 32, 32' are used to cross-couple the second and third control grids of the two tubes. Each voltage divider 32, 32' consists of first, second and third resistors 34, 34', 36, 36' and 38, 38', respectively. Applied across the voltage dividers 32, 32' are a source of operating potential and a negative potential source 40. The second control or screen grid 18 of the first tube 10 is connected to the first voltage divider 32 at the junction of the first and second resistors 34 and 36. The second control or screen grid 18' of the second tube 10' is connected to the second voltage divider 32' at the junction of resistors 34' and 36'. The third control grid 20 of the first tube 10 is connected to the second voltage divider 32' at the junction of the second and third resistors 36' and 38', and the third control grid 20' of the second tube 10' is connected to the first voltage divider 32 at the junction of the second and third resistors 36 and 38. The input terminals 24, 24' may be connected to a suitable source of voltage pulses such as a pulse gating circuit.

The circuit operates as follows: In the absence of input signals, the first control grid 16, 16' of each tube 10, 10' is biased for conduction and the third control grid 20, 20' of each tube is negatively biased to cut off. Therefore, in the quiescent state screen current flows, but plate current does not flow. The screen current circuit of each tube 10, 10' is through the first resistor 34, 34' of the voltage divider 32, 32'. A parallel load circuit is formed by the second and third resistors 36, 36', and 38, 38' of the voltage divider 32, 32'. Thus, the screen functions as an output electrode, and the current drawn by the screen affects the voltage distribution along the voltage divider coupled to it. If a negative pulse is applied to the first control grid 16 of the first tube 10, the screen current in that tube 10 is cut off and the plate current is maintained cut off. Since current is no longer being drawn by the screen 18, the voltage drop decreases across the first resistor 34 of the first voltage divider. This causes the voltage across the second and third resistors 36 and 38 to increase. As a result, the current through the third resistor 38 increases which raises the voltage across that resistor 38. Hence, a positive pulse is applied to the third control grid 20' of the second tube 10' which permits plate current to flow in that tube 10'. This results in a voltage drop across the common anode load resistor 28 and a negative pulse at the output terminal 30. If a negative pulse is applied to the second input terminal 24', the action is the same. The second tube 10' is maintained cut off, and plate current flows in the first tube 10 resulting in a negative output pulse. However, if negative pulses are simultaneously applied to the first control grids 16, 16' of both tubes 10, 10', the negative potentials on these grids 16, 16' maintain both tubes cut off despite the accompanying rise in voltage on the third control grids 20, 20'. Thus, there is no plate current in either tube, and no output pulse. Of course, if an input pulse is not applied to either tube, there will be no plate current flow and hence, no output pulse. Thus, the function "either but not both" is produced.

Although it is not intended to limit the invention to any specific circuit parameters, the following components have been found suitable for an arrangement in accordance with the embodiment shown:

| | |
|---|---|
| Tubes **10**, **10'** | 6AS6. |
| Resistors **22**, **22'**, **36**, **36'** | 100,000 ohms. |
| Resistors **28**, **34**, **34'** | 10,000 ohms. |
| Resistors **38**, **38'** | 82,000 ohms. |
| Condensers **26**, **26'** | .01 microfarad. |
| Source B+ | 150 volts. |
| Source **40** | 100 volts. |

A circuit embodying this invention may be used in an error detecting system for digital computers. As described in the patent to Hamming et al., 2,552,629, granted May 15, 1951, in one such system, each binary character or code group is made up of a specific number of elements or bits (each of which is one or the other of the binary digits, 0 and 1) and added thereto are one or more checking elements. The added checking element may be a 0 or 1 to make the total number of 1's in each character even or odd according to a predetermined convention. Each character may then be checked periodically during the various computer operations, and if the number of 1's is not even or odd according to convention, an error is known to exist. This system of coding is known as a "parity code."

A "parity code checker" may be used to ascertain whether the number of 1's (as represented say by negative pulses) present in a binary character is odd or even. A circuit having the function "either but not both" such as described above, produces an output pulse if two parallel binary digits of a binary character have an odd number of 1's, i. e. a 1 and a 0; but there is no output pulse if there is an even number of 1's i. e. two 1's or zero 1's. A character having any number of binary digits or bits may be checked for parity by a suitable coupling of a plurality of such circuits. For example, to check a four-bit character, two circuits are connected in parallel with each of the four inputs coresponding to one of the bits. The two outputs of these circuits are coupled to the inputs of another "either but not both" circuit constituting the succeeding stage of the parity checker. A pulse or the absence of a pulse from the output of this stage of the parity checker represent respectively an odd or even number of 1's in the four-bit character.

It is, therefore, evident from the above description that the simple circuit embodying this invention inherently produces the function of "either but not both." It is economical in construction and finds widespread utility.

What is claimed is:

1. A signal responsive circuit comprising a first and a second electron discharge tube each having two output electrodes and two control electrodes connected in the same electron discharge path, separate input means for applying signals to a first of the control electrodes of each of said tubes, separate means coupling a first of the output electrodes of each of said tubes to a second of the control electrodes of the other of said tubes, and common output means coupled to the other output electrodes of both of said tubes.

2. A signal responsive circuit as recited in claim 1 wherein said coupling means include voltage dividers.

3. A circuit for translating signals comprising a first and a second electron discharge tube each having two control electrodes and an output electrode connected in the same electron discharge path, means for applying one of said signals to be translated to a first of the control electrodes of said first tube to bias off said tube, means for applying another of said signals to be translated to a first of the control electrodes of said second tube to bias off said second tube, a first control means coupled to said first tube for applying a tube conductive bias voltage to a second of the control electrodes of said second tube responsive to said one signal to be translated being applied to said first tube, a second control means coupled to said second tube for applying a tube conductive bias voltage to a second of the control electrodes of said first tube responsive to said another signal to be translated being applied to said second tube, and a common load impedance coupled to both of said output electrodes.

4. A circuit for translating signals as recited in claim 3 wherein said first control means includes a voltage divider, and said second control means includes a voltage divider.

5. A signal responsive circuit comprising a first and a second electron discharge tube each having a cathode, two output electrodes and two control electrodes, different resistors connecting a first of the control electrodes of each of said tubes to the cathode of the same tube, separate input means for applying signals to said first control electrodes, separate means including an impedance element for applying a negative biasing voltage to a second of the control electrodes of each of said tubes, separate means including an impedance element for applying an operating voltage to a first of the output electrodes of each of said tubes, separate means coupling said first output electrode of each of said tubes to said second control electrode of the other of said tubes, means including a common impedance element for applying an operating voltage to both of the other of said output electrodes, and a common output means coupled to both of said other output electrodes.

6. A signal responsive circuit comprising a first and a second electron discharge tube each having an anode, a cathode and first, second and third grid electrodes, a different input terminal coupled to the first grid electrode of each of said tubes, a first and a second voltage divider, means for applying an operating potential across said voltage dividers, separate means respectively coupling the second grid electrodes of said first and second tubes to intermediate points on said first and second voltage dividers, means including a portion of said second voltage divider for applying a bias voltage to the third grid electrode of said first tube, means including a portion of said first voltage divider for applying a bias voltage on the third grid electrode of said second tube, a common load impedance connected to both of said anodes, and a common output terminal coupled to both of said anodes.

References Cited in the file of this patent

UNITED STATES PATENTS

| | | |
|---|---|---|
| 2,524,953 | Baker | Oct. 10, 1950 |
| 2,557,085 | Fisk et al. | June 19, 1951 |

OTHER REFERENCES

Electronic Engineering, December 1942, "A Simple Electronic Switch," by Russell, pages 284, 285.

Radar Electronics Fundamentals, Nav. Ships 900,016, page 206, Fig. 223 and description of, published June 1944.